United States Patent
Knüfflmann et al.

[11] 3,890,567
[45] June 17, 1975

[54] TEMPERATURE COMPENSATED RESISTANCE MEASURING OF AN ELONGATED ELECTRICAL CONDUCTOR

[76] Inventors: Manfred Knüfflmann, Dhunnberg 18, Leverlusen-Schlebusch; Ingo Seidel, Sulzburgerstr. 263, Koln-Sulz, both of Germany

[22] Filed: Jan. 11, 1974

[21] Appl. No.: 432,524

Related U.S. Application Data
[63] Continuation-in-part of Ser. No. 242,637, April 10, 1972, abandoned.

[30] Foreign Application Priority Data
Apr. 14, 1971  Germany............................ 2118015

[52] U.S. Cl. ............................................. 324/64
[51] Int. Cl. .......................................... G01r 27/14
[58] Field of Search ................ 324/64, 65 R, 62, 51

[56] References Cited
UNITED STATES PATENTS

| | | | |
|---|---|---|---|
| 2,328,853 | 9/1943 | Sherrard | 324/65 R |
| 2,608,604 | 8/1952 | Hart | 324/65 R |
| 3,170,111 | 2/1965 | Case | 324/65 R X |
| 3,231,336 | 1/1966 | Lindberg, Jr | 324/65 R X |
| 3,412,325 | 11/1968 | Soderling | 324/65 R |
| 3,500,187 | 3/1970 | Fegan, Jr. | 324/65 R |

FOREIGN PATENTS OR APPLICATIONS

| | | | |
|---|---|---|---|
| 371,998 | 3/1923 | Germany | 324/64 |
| 85,511 | 2/1936 | Sweden | 324/64 |

*Primary Examiner*—Stanley T. Krawczewicz
*Attorney, Agent, or Firm*—Kurt Kelman

[57] ABSTRACT

The value of the electrical resistance and of the temperature of an elongated electrical conductor is measured at short time intervals while it is continuously advanced in a longitudinal direction during the manufacturing process, and the measured resistance is corrected to the resistance value at a predetermine temperature, particularly 20°C. Slidable contacts are pressed against the conductor to measure the resistance and a thermometer adjacent the conductor measures the temperature. It is desirable to connect the contacts and thermometer to a computer to automate the operation.

9 Claims, 4 Drawing Figures

TEMPERATURE COMPENSATED RESISTANCE MEASURING OF AN ELONGATED ELECTRICAL CONDUCTOR

CROSS REFERENCE TO RELATED APPLICATION

This is a continuation-in-part of our copending application Ser. No. 242,637, filed Apr. 10, 1972 and now abandoned.

BACKGROUND OF THE INVENTION a. Field of the Invention

The present invention relates to improvements in a process and apparatus of manufacturing an elongated electrical conductor which is continuously advanced during the manufacturing process in a longitudinal direction.

b. Discussion of the Prior Art

Ohm's law is used to measure the resistance with direct current, for instance with a galvanometer or a measuring bridge.

In a known manufacturing process for making a conductor of cross section, the manufacturing process is interrupted and, while the conductor is at rest, two contacts are pressed against the conductor to test its resistance. The two contacts are engaged with the conductor at a distance of, say, one meter to supply electrical current to the conductor, and the resistance encountered by the current in the conductor is measured by a voltmeter connected to the contacts so that the resistance may be determined from the known value of the current. After the measurement has been completed, the contacts are removed from the conductor and the manufacturing process is continued. Since the temperature of the conductor must be known during the measurement, the conductor is immersed in a water bath of known temperature.

It is disadvantageous that the production must be interrupted each time the resistance is measured and this becomes particularly burdensome economically in instances where the resistance of the conductor must be measured at short time intervals to meet strict manufacturing tolerances.

It is the primary object of this invention to overcome this disadvantage and to provide a method and apparatus permitting continuous manufacture of elongated electrical conductors while measuring the electrical resistance and temperature thereof.

SUMMARY OF THE INVENTION

The above and other objects are accomplished in accordance with the invention by measuring the value of the electrical resistance and of the temperature of the electrical conductor at short time intervals while the conductor continuously advances during the manufacturing process, and correcting or adjusting the measured resistance to the resistance value at a predetermined temperature, more particularly at 20°C.

In this procedure, there is no interruption of the advancing movement of the conductor during the manufacturing process and while the measurements are made at short intervals, the measurements being quasi-continuous and the measuring intervals being reduced to minimal durations according to requirements. The measured values may be transmitted to a digital computer to program and automate the process steps.

In the apparatus of the present invention, contacts which may be pressed against or engaged with the moving elongated conductor are arranged for movement along the path of the advancing conductor to measure the resistance and a thermometer is arranged adjacent the conductor for movement in its path to measure the temperature thereof, a radiation thermometer or bolometer being particularly useful.

In an automated manufacturing process, the contacts and the thermometer are connected to a computer which also contains other production data for the manufacture of the conductor so that the measured electrical resistance and temperature may become part of the control data for the process which is controlled by the computer.

The above and other features of this invention will become more apparent from the following detailed description of a now preferred embodiment thereof, taken in conjunction with the accompanying drawing wherein

DETAILED DESCRIPTION OF THE INVENTION

Figure 1:
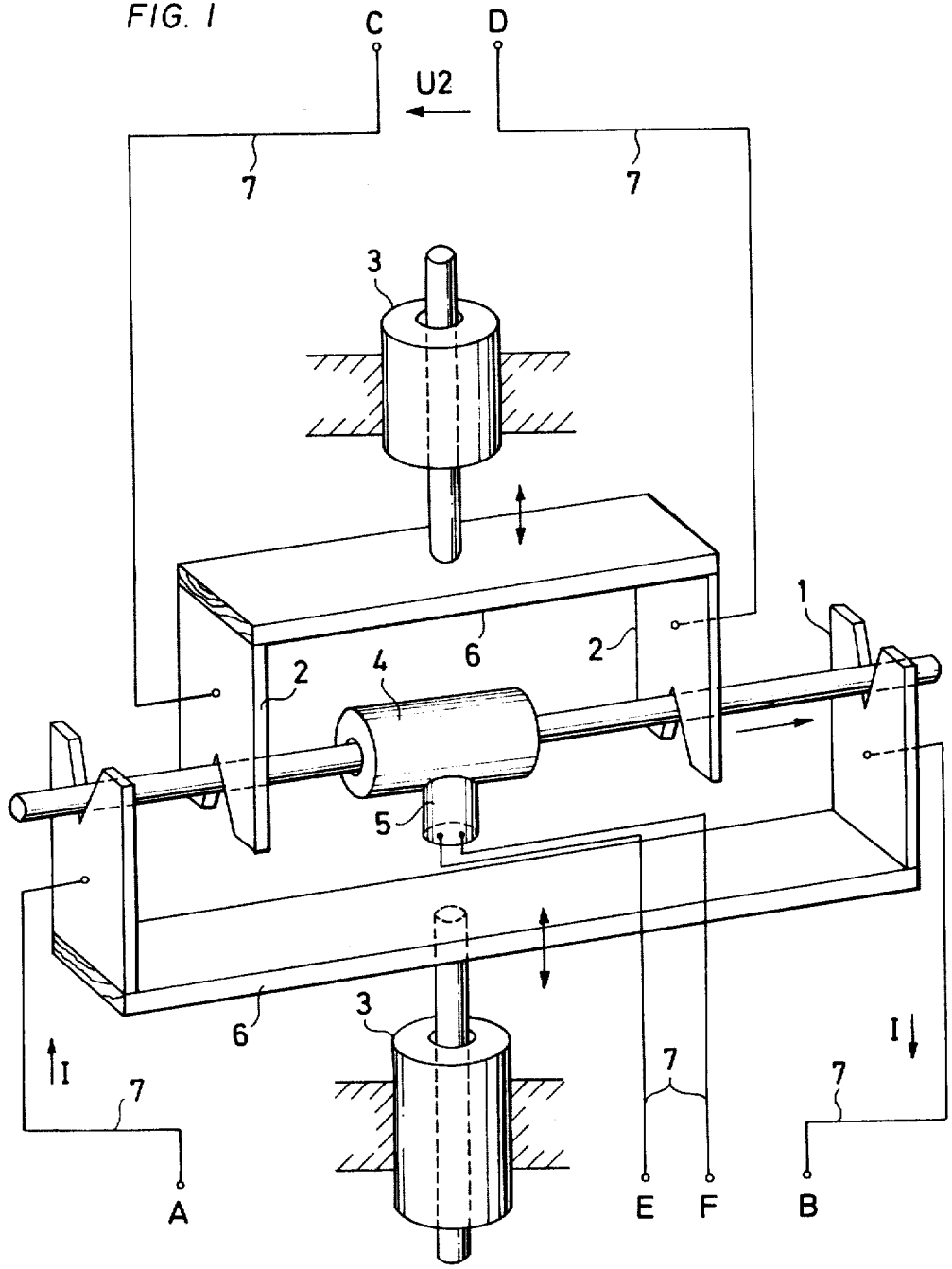
FIG. 1 is a schematic perspective view of an arrangement showing the method and apparatus of the invention.

Referring now to the drawing and first to FIG. 1, the elongated conductor L, which is continuously advanced in the direction of the horizontal arrow, is engaged at four points by contacts arranged in the path of the moving conductor. The first pair of contacts 1, 1 forms part of the measuring current circuit I. The contacts are mounted on insulating bridge 6 which is connected to a rod which is reciprocable in the direction of the double-headed vertical arrow in a direction transverse to the path of conductor L by a solenoid or hydraulic cylinder 3 to move the pair of contacts into and out of engagement with the conductor. A second pair of contacts 2, 2 forms part of the circuit supplying the measuring voltage $U_2$ to the contacts. These contacts, too, are mounted on an insulating bridge 6 which is connected to a rod similarly reciprocable by a solenoid or hydraulic cylinder 3 to move the second pair of contacts into and out of engagement with the conductor.

A radiation thermometer of known structure is arranged adjacent the moving conductor, a tubular carrier 4 whose inside is mirrored to receive the heat radiation from the conductor passing through the axial bore of the carrier having attached thereto a heat radiation receiver, such as bolometer 5.

Figure 3:
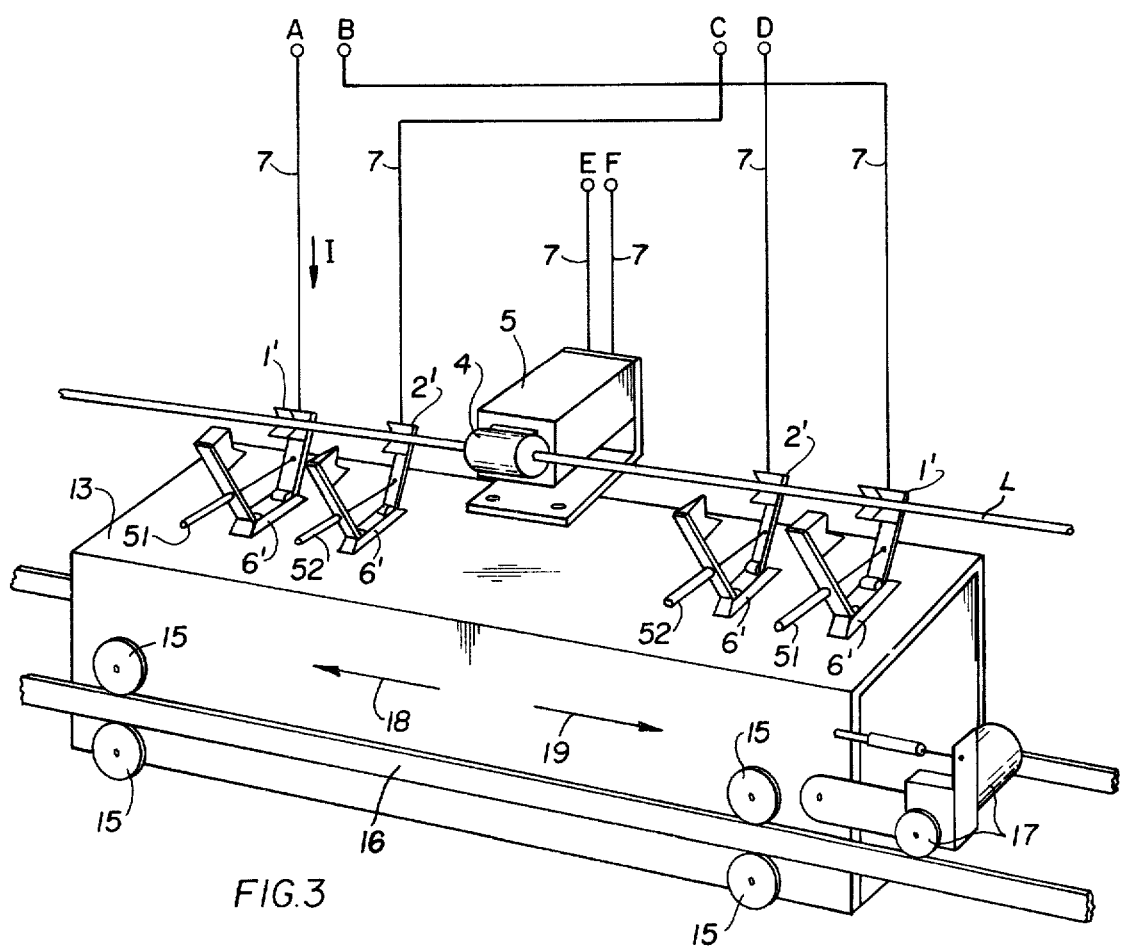
FIG. 3 is an isometric view of an alternate embodiment of the apparatus shown in FIG. 1.

The entire apparatus consisting of devices 1 to 6 is mounted on a carriage as shown in FIG. 3 to follow the advancing movement of the conductor for a certain distance, and the carriage may then be automatically returned to its initial portion for the next scanning operation.

In a specific embodiment, the permanent distance between contacts 1, 1 in the direction of movement of the conductor is one meter while contacts 2, 2 are spaced half a meter apart. The mounting carriage may have a stroke of 9.5 meter, after which it is automatically returned to the initial position.

Flexible wires 7 connect the respective contacts to the respective terminals A, B, C and D, as well as the bolometer to terminals E, F. The measuring current is supplied by terminals A, B. The voltage drop along conductor L is measured at terminals C, D, and the voltage at terminals E, F is proportional to the temperature of the conductor.

FIG. 3 depicts an alternate embodiment of the invention shown in FIG. 1 and includes structural elements omitted from FIG. 1 for the sake of clarity. As shown in FIG. 3, the conductor L is conductively engaged by a first pair of contacts 1'—1' and a second pair of contacts 2'—2' respectively pivotally hinged to a pair of insulating bridges 6', in a manner analagous to that shown in FIG. 1. Unlike the arrangement shown in FIG. 1, however, the contacts are releasably secured to the moving conductor L by actuating cables 51 and 52 which pivot contacts 1' and 2' into engagement with the conductor L. The bridges 6', the tubular carrier 4 and the bolometer 5 are mounted on a carriage 13 which is slideably supported by wheels 15 on a pair of guide rails 16. Carriage 13 may thus be moved horizontally in the direction shown by arrow 19 with the conductor L and, after the resistance and temperature measurements have been made, may be withdrawn in the direction shown by arrow 18 by means of drive mechanism 17.

Figure 2:
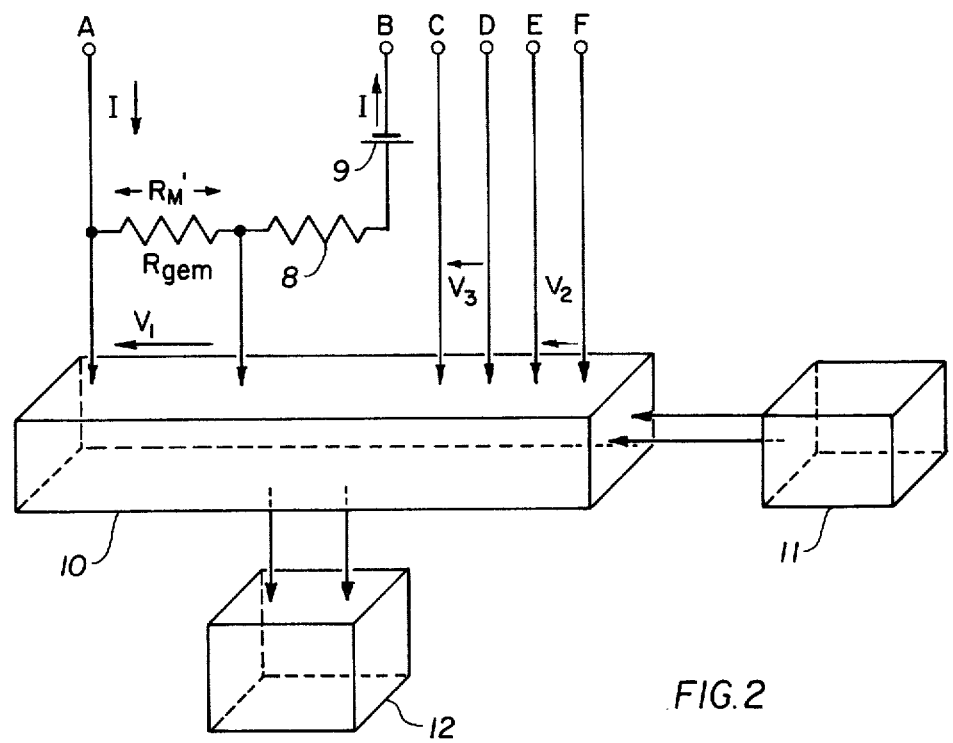
FIG. 2 is an example of a circuit diagram useful therein.

Referring now to FIG. 2, the measuring current I is derived from storage battery 9, the resistance 8 in the measuring circuit limiting the current. At the measuring resistance $R_M$, the voltage is reduced proportional to the measuring current I, the voltage $U_1 = I \cdot R_M$. The terminals C, D. are connected to computer 10 to transmit the measuring voltage $U_2$ thereto. The signal corresponding to the temperature is transmitted to the computer from terminals E, F which are connected thereto. The computer, with input unit 11 and output unit 12, calculates first the actually measured resistance $R_{gem}$ according to the formula $$R_{gem} = R_M \frac{U_2}{U_1} \cdot \frac{V_2}{V_1}$$

However, since the value of resistance $R_{20}$, at the temperature of 20°C. is of interest, the computer must effectuate a correction calculation according to the formula $$R_{20} = R_{gem}/\left\{1 + \alpha(T_{gem} - 20°C)\right\}$$

wherein $\alpha$ = temperature coefficient of the specific resistance
$T_{gem}$ = measured temperature represented by the voltage at EF.

Figure 4:
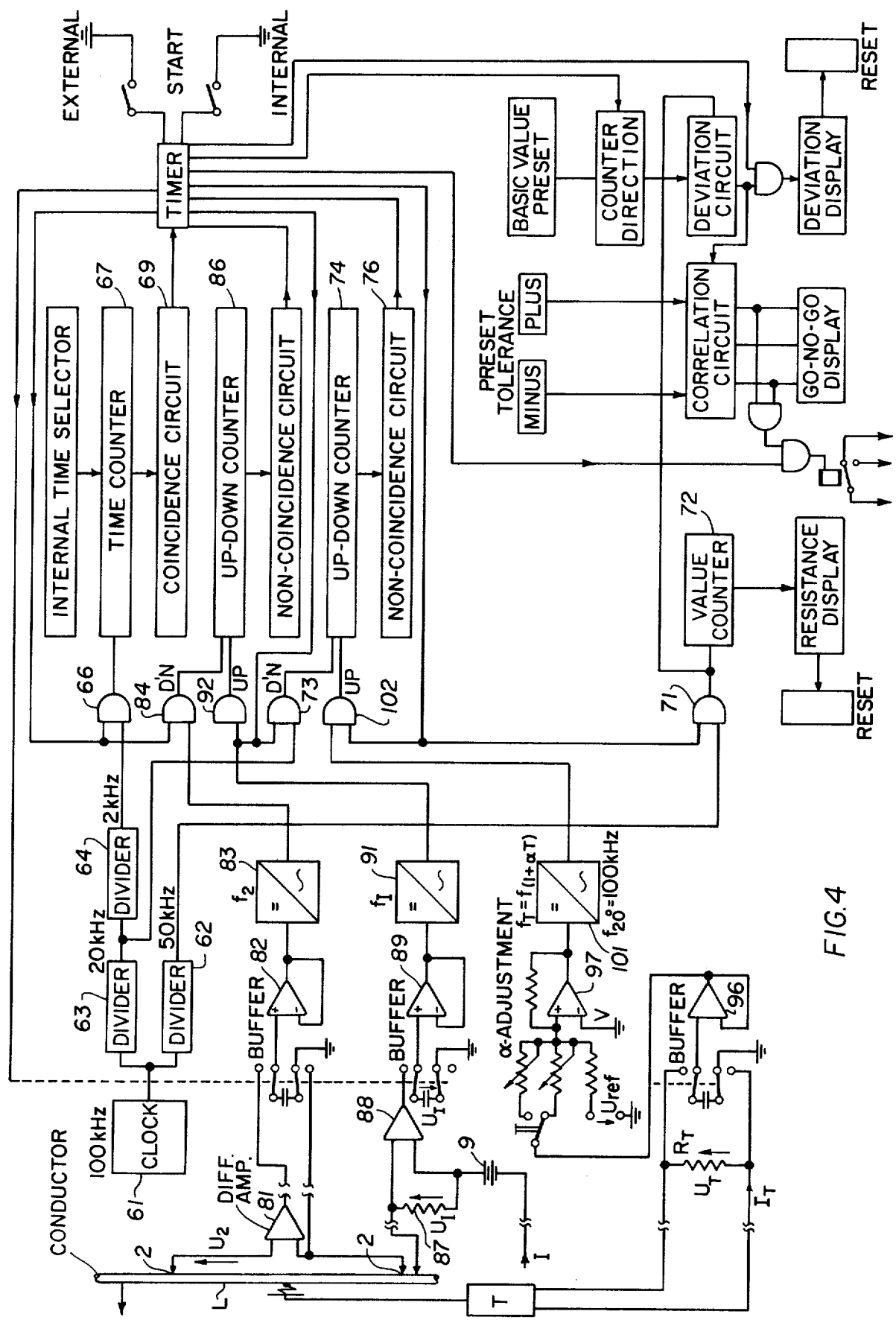
FIG. 4 depicts the circuitry shown in FIG. 2 in greater detail.

FIG. 4 depicts the circuitry of computer 10, input unit 11 and output unit 12 in greater detail. Since this circuitry is entirely conventional and does not form part of the invention, it will only be described in sufficient detail to explain the operation of the invention in conjunction with this conventional circuit.

A quality crystal oscillator 61 having an output of 100 KHz is connected to frequency dividers 62, 63 and 64 which respectively produce at their outputs signals at frequencies of 50, 20 and 2 KHz. The output of divider 64 is connected to the input of an AND-gate 66 whose output is connected to the input of a time-counter 67 and thence to a timer 68 via a coincidence circuit 69.

In like manner, the output of divider 62 is connected to the input of an AND-gate 71 and thence to a value counter 72. The output of divider 63, on the other hand, is connected to the input of an AND-gate 73 and thence to the "down" input of an up-down counter 74, the output of which is connected through a non-concidence gate 76 to timer 68. The potential $U_2$ developed across conductor L, by current I and sensed by contacts 2-2 is amplified in a difference amplifier 81 and a buffer amplifier 82, and then applied to the input of a voltage-to-frequency converter 83 which is connected, via and AND-gate 84, to the "down" input of a second up-down counter 86. In like manner, the value of the current I is itself sampled by a resistor 87 and amplified by amplifier 88 and buffer amplifier 89. The output of amplifier 89 is connected to a second voltage-to-frequency converter whose output is connected, via an AND-gate 92, to the "up" input of counter 86. The output of counter 86 is connected, via a non-coincidence circuit 93, to timer 68. In like manner, the output of bolometer 5, i.e., the voltage $U_T$, is amplified by buffer amplifier 96 and difference amplifier 97 and applied to the input of a third voltage-to-frequency converter 101. The output of converter 101 is connected, via an AND-gate 102, to the up input of up-down counter 74. The other inputs of AND-gates 102, 73, 92, 84, 66 and 71 are connected to timer 68 for synchronization purposes.

In operation, the current $I_T$ delivered by the temperature sensor 5 is proportional to the temperature of the cable L and develops a voltage drop of $U_T$ across resistor $R_T$. This voltage is added to a reference voltage in amplifier 97 to adjust to the reference temperature of 20°C. Thus, the frequency generated by converter 101, $f_t$, is proportional to the temperature of the conductor L with a reference of 20°C. The circuit is based upon the relationship $$N = K \cdot \frac{f_u}{f_i \cdot f_t}$$

where $N$ = the indicated resistance,
$K$ = a constant,
$f_u$ = the frequency from converter 83 (proportional to measured voltage), $f_i$ = the frequency from converter 91 (proportional the value of battery 9), and
$f_t$ = the output from converter 101.

The frequencies $f_u$, $f_i$ and $f_t$ are counted and operated on by the logic circuiting shown, including up-down counters 74 and 86, all of which is conventional and designed to solve the above-listed equation. More particularly, for 400 MS, a preselected and arbitrary measuring interval, counter 86 will count-up at the frequency $f_u$. After this event, counter 86 will count down to 0 count at the frequency $f_i$.

During this period, counter 74 will count-up at the fixed frequency of 20 KHz and then count down at the frequency of $f_t$.

During this same period, i.e. while counter 74 is counting down to zero, the value counter 72 is counting the output of divider 62 (50 KHz) and thus counts the active resistance of cable L converted to the reference 20°C.

Of course, the circuitry shown in FIG. 4 is merely representative of the many known circuits that could be used to solve the equation above.

One skilled in the art may take various changes to the apparatus shown, without departing from the spirit and scope of the invention.

We claim:

1. A method of determining the resistance of an elongated conductor while said conductor moves in the direction of elongation thereof which comprises:
   a. conductively securing a plurality of contacts to a portion of said conductor in longitudinally spaced relationship;
   b. moving the secured contacts jointly with said conductor; and
   c. generating a signal indicative of the resistance between two of said contacts while said two contacts move jointly with said conductor.

2. A method according to claim 1, wherein said two contacts are released after said generating from said portion of the conductor and thereafter conductively secured to another portion of said conductor in longitudinally spaced relationship for joint movement with said second portion, and another signal indicative of the resistance between said two contacts is generated while said two contacts move jointly with said second portion.

3. A method according to claim 2, wherein the spacing of said two contacts in said direction is the same during the generating of the respective signals indicative of the resistances between said two contacts while moving with said portions of said conductor.

4. A method according to claim 2, wherein the temperature of each of said portions of said conductor is sensed during the generating of said two signals, a temperature signal is generated in response to each sensed temperature, and a signal indicative of the resistance of each of said portions at a reference temperature is produced in response to the generated signals.

5. A method according to claim 1, wherein a direct current is passed through said portion of said conductor between a third and a fourth one of said contacts, a signal responsive to the voltage drop between said two contacts being generated as an indication of said resistance.

6. Apparatus for determining the resistance of an elongated conductor while said conductor moves in a path in the direction of elongation thereof comprising:
   a. a carrier;
   b. guide means for guiding movement of said carrier in said direction adjacent said path;
   c. a plurality of contacts mounted on said carrier and spaced in said direction;
   d. engaging means for releasably engaging said contacts with said conductor in longitudinally spaced relationship, and for thereby maintaining a conductive connection between said contacts while said conductor moves in said path and said carrier moves in said direction jointly with said conductor; and
   e. resistance measuring means for measuring the resistance between two of said contacts while said two contacts move jointly with said carrier and said conductor.

7. Apparatus according to claim 6, further comprising temperature measuring means on said carrier for measuring the temperature of said conductor.

8. Apparatus according to claim 7, wherein said resistance measuring means and said temperature measuring means include means for generating an electrical resistance signal and an electrical temperature signal, and circuit means responsive to the generated signals to indicate a resistance at a reference temperature corresponding to the measured resistance.

9. Apparatus according to claim 6, wherein said engaging means include means for releasing the engaged contacts from said conductor, the apparatus further comprising moving means for moving said carrier in a direction opposite to the direction of conductor movement while said contacts are released from said conductor.

* * * * *